United States Patent
Okawa

(10) Patent No.: US 7,786,882 B2
(45) Date of Patent: Aug. 31, 2010

(54) OCCUPANT-DETECTING APPARATUS

(75) Inventor: Noriyuki Okawa, Nakano-ku (JP)

(73) Assignee: Calsonic Kansei Corporation, Tokyo (JP)

( * ) Notice: Subject to any disclaimer, the term of this patent is extended or adjusted under 35 U.S.C. 154(b) by 295 days.

(21) Appl. No.: 12/073,432

(22) Filed: Mar. 5, 2008

(65) Prior Publication Data

US 2008/0231094 A1    Sep. 25, 2008

(30) Foreign Application Priority Data

Mar. 6, 2007 (JP) ............................... 2007-055222

(51) Int. Cl.
*G08B 21/00* (2006.01)
(52) U.S. Cl. ................. 340/667; 340/665; 340/666; 180/273
(58) Field of Classification Search .......... 340/667, 340/665, 666; 73/865; 180/271, 273
See application file for complete search history.

(56) References Cited

U.S. PATENT DOCUMENTS

| | | | |
|---|---|---|---|
| 6,685,222 B2 * | 2/2004 | Winkler et al. | 280/735 |
| 6,774,804 B2 | 8/2004 | Sakai et al. | |
| 7,023,355 B2 | 4/2006 | Sakai et al. | |
| 7,026,946 B2 * | 4/2006 | Saunders et al. | 340/666 |
| 7,039,503 B2 * | 5/2006 | Kiribayashi | 701/1 |
| 7,055,639 B2 * | 6/2006 | Kiribayashi | 180/271 |
| 7,205,902 B2 * | 4/2007 | Kiribayashi | 340/667 |
| 7,266,471 B2 | 9/2007 | Jitsui et al. | |
| 7,548,808 B2 * | 6/2009 | Winkler | 701/45 |

FOREIGN PATENT DOCUMENTS

| | | |
|---|---|---|
| JP | 2002-240613 | 8/2002 |
| JP | 2004-182005 | 7/2004 |
| JP | 2004-284392 | 10/2004 |
| JP | 2006-256597 | 9/2006 |
| JP | 2008-18863 | 1/2008 |

* cited by examiner

*Primary Examiner*—Toan N Pham
(74) *Attorney, Agent, or Firm*—Wenderoth, Lind & Ponack, L.L.P.

(57) ABSTRACT

An occupant-detecting apparatus includes a plurality of load sensors configured to detect a load imparted on a vehicle seat, and an occupant-sitting determination device configured to determine whether or not an occupant is seated on the vehicle seat, based on detected result of the load sensors. The load sensors are configured to detect loads at different positions on the vehicle seat, and the occupant-sitting determination device is configured not to perform occupant-sitting determination if an absolute value ($\Delta W$) of a variable amount in a sum of detected result of the load sensors is lesser than a predetermined threshold value (TH/L).

7 Claims, 5 Drawing Sheets

OCCUPANT-DETECTING APPARATUS

CROSS-REFERENCE TO THE RELATED APPLICATION

This application is based on and claims the priority benefit of each of Japanese Patent Application No. 2007-55222, filed on Mar. 6, 2007, the contents of which are incorporated herein by reference.

BACKGROUND OF THE INVENTION

1. Field of the Invention

The present invention relates to an occupant-detecting apparatus for a vehicle, which is configured to detect whether or not an occupant is seated on a vehicle seat.

2. Description of Related Art

A conventional occupant-detecting apparatus is configured to mount a load sensor on each of a plurality of legs supporting a vehicle seat and determine whether or not an occupant is seated on the vehicle seat, or the seated occupant is an adult or a child or the like, based on detected result of the load sensors (for reference, see JP 2008-018863A, FIG. 4, paragraphs 0014 to 0020, and JP 2006-256597A).

In the occupant-detecting apparatus, if a sum of the variable amounts of the detected results of the load sensors exceeds a predetermined threshold value, seated determination or occupant-sitting determination is not performed. Thereby, if a vehicle turns, suddenly starts or suddenly stops, the occupant-sitting determination is not performed.

However, if the vehicle turns at a low speed as in a slow curve or the like, the load sensors detect a less variable amount, and hence there is a case that the sum of the variable amount does not exceed the threshold value.

Therefore, in the aforementioned occupant-detecting apparatus, the occupant-sitting determination is performed by determination of the fact that the vehicle is stable if the vehicle has a less variable amount as in a low speed turn or the like. Consequently, there is possibility that the occupant-sitting determination is performed while the vehicle turns, and hence erroneous occupant-sitting determination is performed

SUMMARY OF THE INVENTION

An object of the present invention is to provide an occupant-detecting apparatus capable of enhancing reliability of occupant detection without performing excessive occupant-sitting determination.

To accomplish the above object, an occupant-detecting apparatus according to one embodiment of the present invention includes a plurality of load sensing devices configured to detect a load imparted on a vehicle seat and an occupant-sitting determination device configured to determine whether or not an occupant is seated on the vehicle seat, based on detected result of the load sensing devices.

The load sensing devices are configured to detect loads at a plurality of different positions on the vehicle seat.

The occupant-sitting determination device is configured to control the occupant-sitting determination based on a comparison between an absolute value of the variable amount of a sum of detected results of the load sensing devices and a predetermined threshold value.

DETAILED DESCRIPTION OF THE PREFERRED EMBODIMENTS

Preferred embodiments of the present invention will be explained in detail below with reference to the accompanying drawings.

First Embodiment

Figure 1:
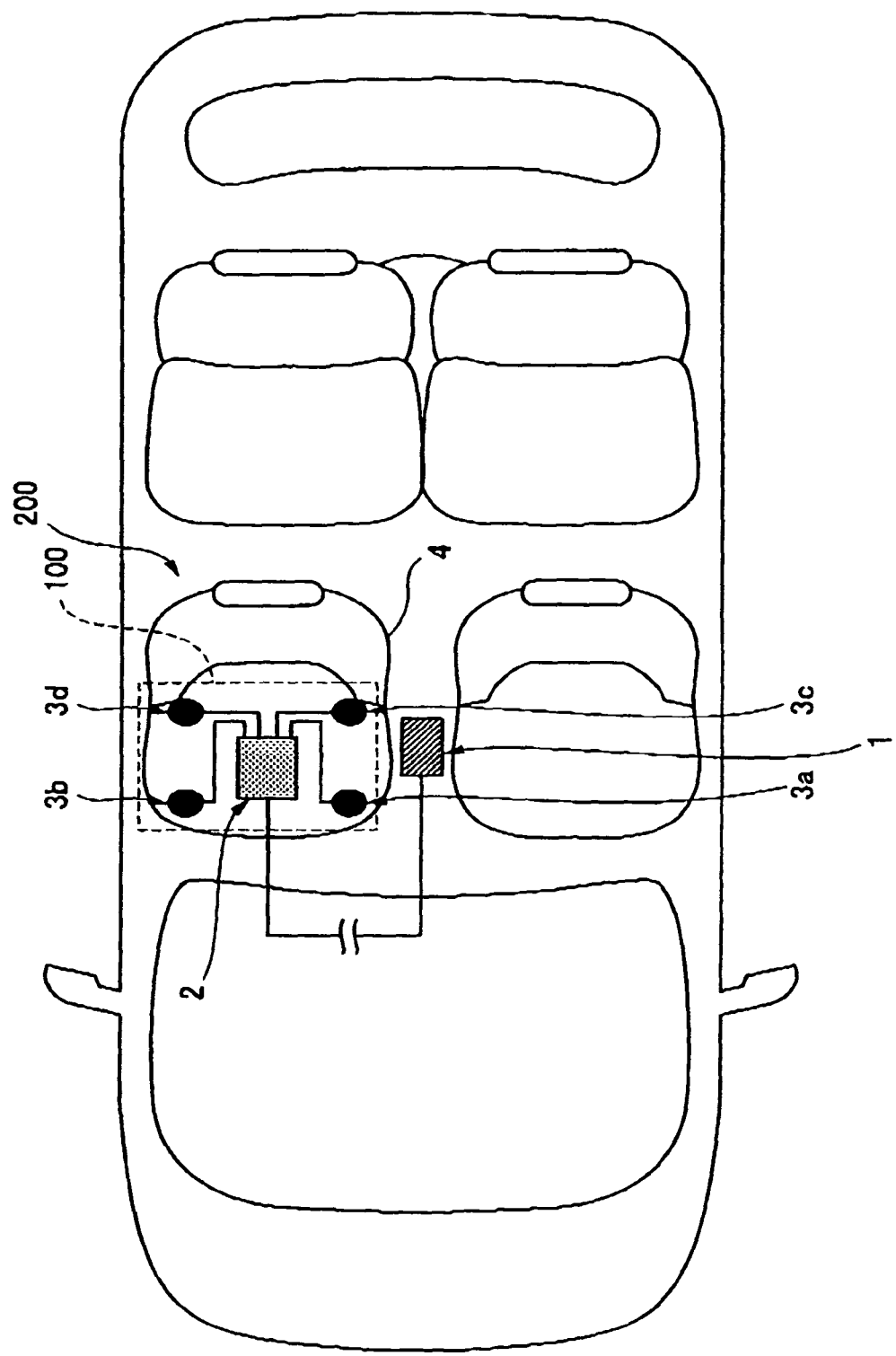
FIG. 1 is an explanatory view showing a structure of an airbag system using an occupant-detecting apparatus according to a first embodiment of the present invention.

FIGS. 1 to 4 illustrate a state where an occupant-detecting apparatus 100 for a vehicle according to a first embodiment of the present invention is installed in an airbag system 200 which is mounted on a vehicle as shown in FIG. 1.

Figure 2:
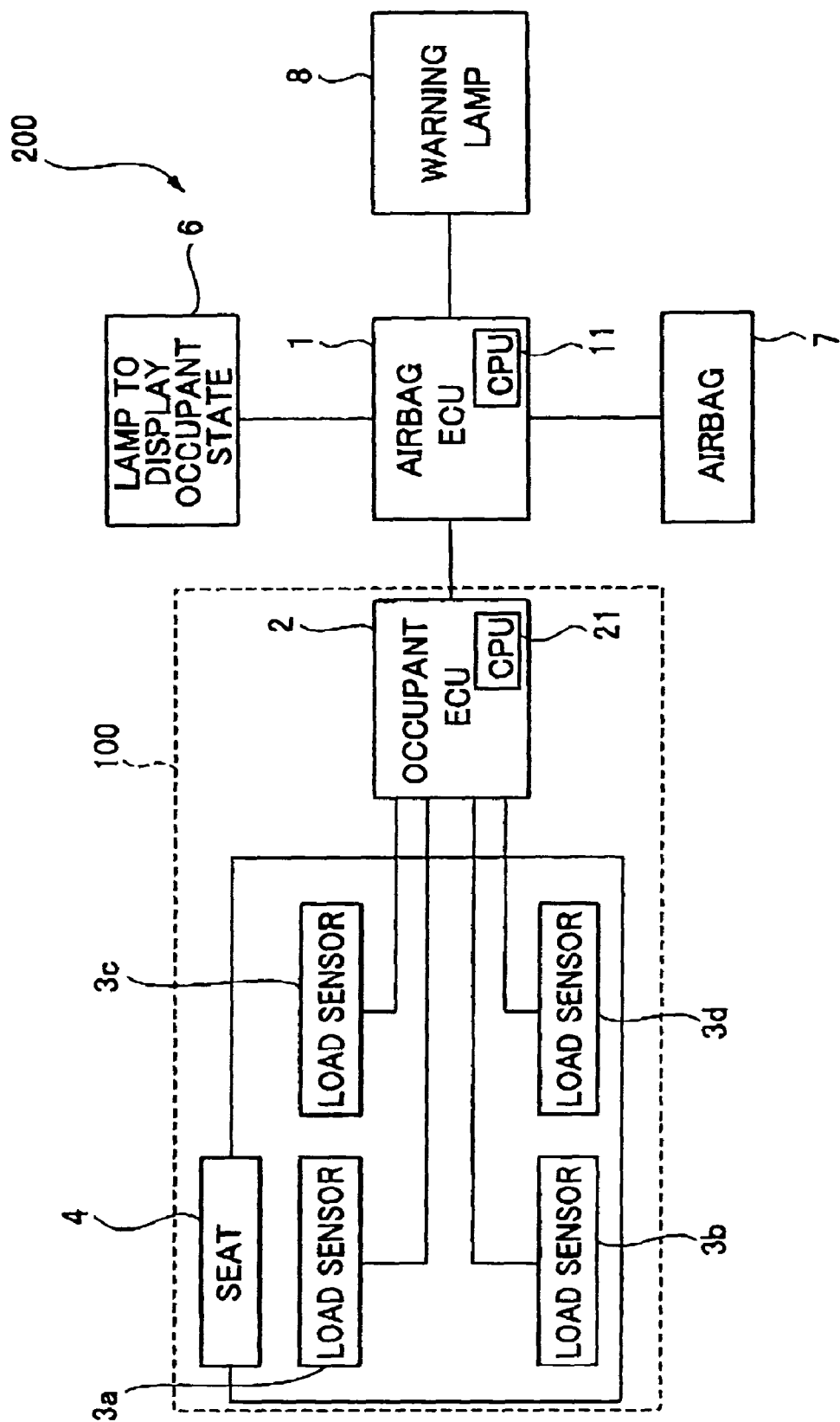
FIG. 2 is a block view showing the airbag system using the occupant-detecting apparatus according to the first embodiment.
Figure 3A:
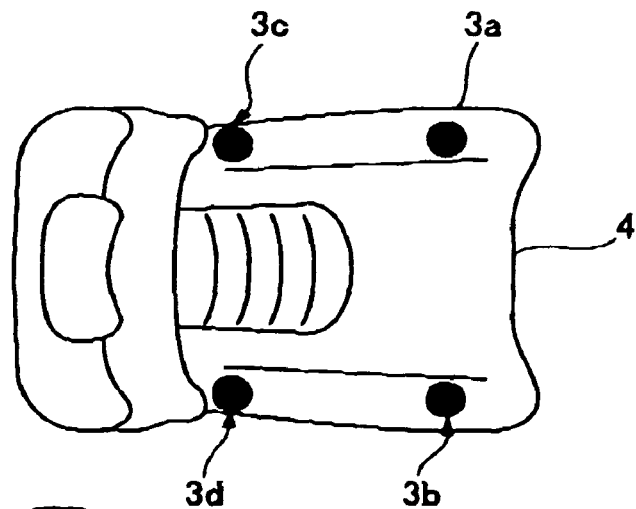
FIG. 3A is a plan view showing a mounting structure of load sensors in the occupant-detecting apparatus according to the first embodiment.
Figure 3B:
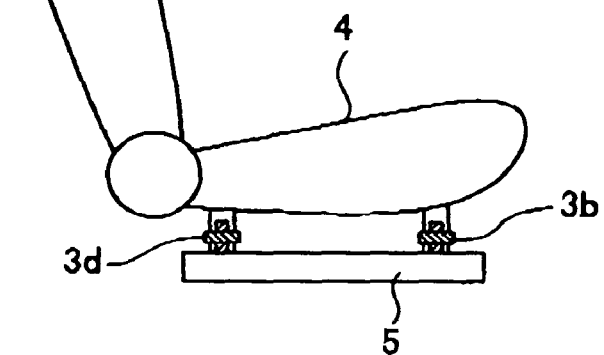
FIG. 3B is a side view showing the mounting structure of the load sensors in the occupant-detecting apparatus according to the first embodiment.
Figure 3C:
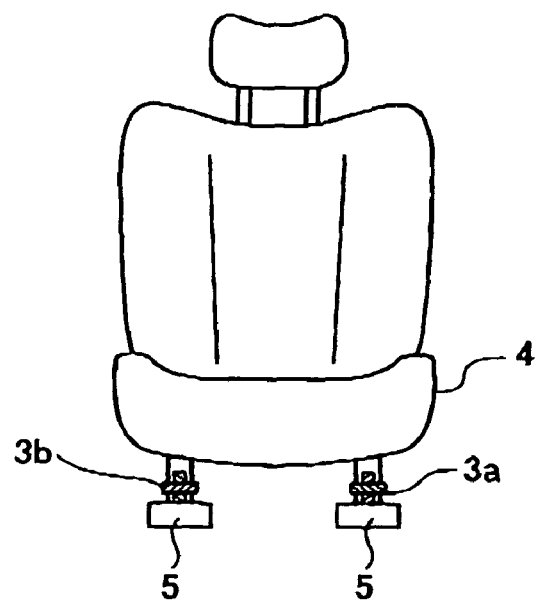
FIG. 3C is a front view showing the mounting structure of the load sensors in the occupant-detecting apparatus according to the first embodiment.

The airbag system 200 includes an airbag 7, an airbag ECU (airbag-electric control unit) 1 which is connected to the airbag 7 and configured to control inflation and deflation of the airbag 7, the occupant-detecting apparatus 100 according to the present invention, a lamp 6 which is connected to the airbag ECU and configured to display an occupant state, and a warning lamp 8 connected to the airbag ECU 1, as shown in FIG. 2.

Meanwhile, the airbag 7 is inflated by an appropriate inflation device (not shown).

As shown in FIG. 2, the airbag ECU 1 includes a CPU (central processing unit) 11 which controls the airbag 7 based on the occupant's information obtained from the occupant-detecting apparatus 100 in such a manner that the airbag 7 is not inflated if an occupant is not seated on a seat, the airbag 7 is completely inflated if an adult occupant is seated on the seat, and the airbag 7 is not inflated if a child occupant is seated on a seat by use of a child seat, etc.

The displaying lamp 6 is configured to display, for example, a detected result of occupant states such as the absence of occupant, the presence of an adult occupant, the presence of a child seat or the like. The airbag 7 is inflated by the inflation device to protect an occupant seated on a seat to ease the impact generated at the time of collision of the vehicle.

Meanwhile, the airbag 7 is structured so that the inflation can be controlled by the airbag ECU 1 to be changed into at least two steps.

The warning lamp 8 is a display light which warns of a failure in at least one part in the airbag system 200 and the occupant-detecting apparatus 100 detected by a detector (not shown).

As shown in FIG. 2, the occupant-detecting apparatus 100 is connected to the airbag ECU 1 and includes a plurality of load sensing devices 3a to 3d configured to detect a load imparted on, for example, a vehicle seat 4 and an occupant-sitting determination device 2 to determine whether or not the occupant is seated on the vehicle seat 4, based on a detected result of the load sensing devices 3a to 3d.

The occupant-sitting determination device 2 comprises, for example, an occupant ECU (occupant-electric control unit) to detect the occupant, and the load sensing devices 3a to 3d comprise, for example, load sensors, in the first embodiment as illustrated.

The occupant-sitting determination device or occupant ECU 2 includes a CPU 21 which processes an output from the load sensors 3a to 3d, determines whether or not the occupant is seated (presence or absence), and whether the occupant is an adult or child using a child seat, and outputs a determined result. Here, the determination of the occupant-sitting determination device is referred to as an occupant-sitting determination. The output determined result is input into the airbag ECU 1.

The occupant-sitting determination device 2 also includes a comparator (not shown) which computes a variable amount between a sum of previous sampling values (i.e., previously-collected load sample values) and a sum of present sampling values (i.e., presently-collected load sample values) detected by the load sensors 3a to 3d and compares an absolute value of the variable amount with a predetermined threshold value TH/L.

Here, the occupant-sitting determination device 2 is configured to control the occupant-sitting determination based on a comparison between an absolute value of the variable amount of a sum of detected results of the load sensing devices and a predetermined threshold value.

The occupant-sitting determination device also is configured not to perform the occupant-sitting determination, if the absolute value is lesser than the predetermined threshold value.

The occupant-sitting determination device is further configured not to perform the occupant-sitting determination, if the absolute value is larger than the predetermined threshold value, and to perform the occupant-sitting determination despite a magnitude of the absolute value after the occupant-sitting determination is not performed.

The plurality of load sensors 3a to 3d are mounted on the vehicle seat 4 and are configured to detect a load at each of different four places on this seat.

Meanwhile, the load sensors 3a to 3d are respectively provided on a left anterior portion, a right anterior portion, a left posterior portion and a right posterior portion of the seat 4 which is movably mounted on rails 5 (see FIGS. 1 and 3A to 3C). More specifically, the load sensors 3a to 3d are attached to sliding members, each of which is attached at one end to a bottom surface of the seat 4 and slidably disposed on the rail 5 (see FIGS. 3 B and 3C). Thereby, a load at each of the different places or positions or, for example, four positions on the seat 4 is individually detected.

In this embodiment, a passenger seat may be used for the seat 4, for example.

Figure 4:
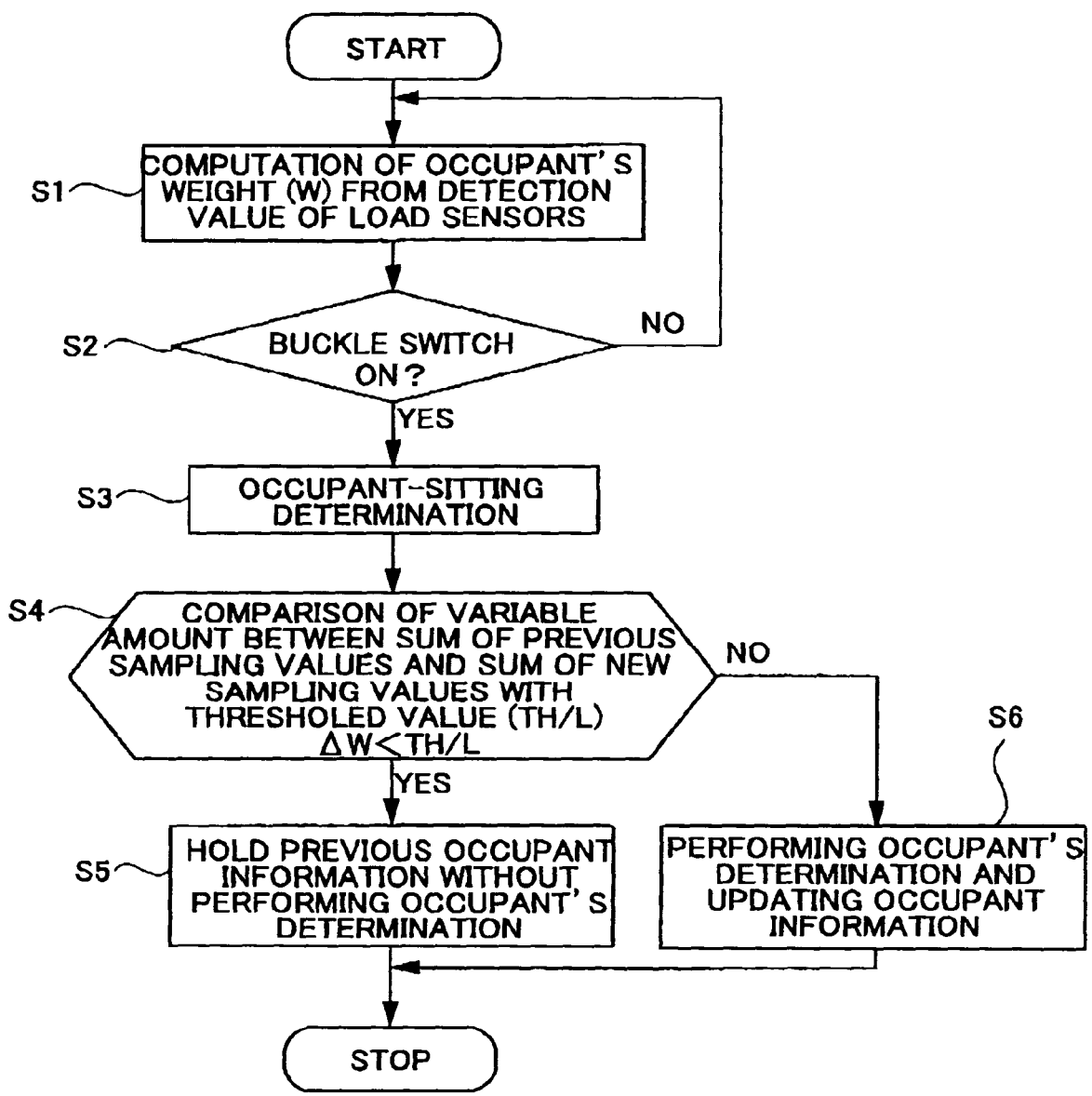
FIG. 4 is a flow chart showing a process for occupant-sitting determination in the occupant-detecting apparatus according to the first embodiment of the present invention.

Next, operation of the occupant-detecting apparatus 100 according to the first embodiment of the present invention is explained with reference to a flow chart of FIG. 4.

When a driver is seated on a driver seat and an ignition key is turned ON by the driver, for example, a detection signal is supplied from the load sensors 3a to 3d on, for example, the passenger seat 4 to the occupant ECU2. The occupant-sitting determination device 2 computes an occupant's weight W on the seat 4 based on the detection signal (Step 1).

The occupant's weight W is computed, and the occupant-sitting determination device 2 waits for an output signal from a buckle switch (not shown) (Step 2). If the occupant-sitting determination device 2 receives the output signal, based on the occupant's weight W, an occupant-seated determination is performed (Step 3).

Meanwhile, the occupant-sitting determination device is set to determine that a child using a child seat is seated if the occupant's weight W is less than a predetermined threshold value, whereas an adult is seated if the occupant's weight W is larger than a predetermined threshold value. The determined result is input into the airbag ECU 1.

Next, the occupant-sitting determination device 2 computes a variable amount between a sum of previous sampling values and a sum of present sampling values of the load sensors 3a to 3d and compares an absolute value of the variable amount with a predetermined threshold value TH/L by the use of the comparator (Step 4).

That is to say, it is set that a previous detection value of the left anterior load sensor 3a is Fi1 and a new detection value of the left anterior load sensor 3a is Fi2, a previous detection value of the left posterior load sensor 3b is Ri1 and a new detection value of the left posterior load sensor 3b is Ri2, a previous detection value of the right anterior portion 3c is Fo1 and a new detection value of the right anterior portion 3c is Fo2, a previous detection value of the right posterior portion 3d is Ro1 and a new detection value of the right posterior portion 3d is Ro2.

It also is set that a sum Fi1+Ri1+Ro1+Fo1 of the previous detection values is W1, a sum Fi2+Ri2+Ro2+Fo2 of the previous detection values is W2 and a variable amount, in other wards, (W1−W2) is ΔW. The ΔW is then compared with the threshold value TH/L. If the ΔW is less than the threshold value TH/L (ΔW<TH/L), in other words, if it is YES in Step 4, the occupant-sitting determination is not performed to hold (maintain) the occupant's information (Step 5). If the ΔW is larger than the threshold value TH/L (ΔW≧TH/L), in other words, if it is NO in Step 4, the occupant-sitting determination is performed again and occupant information input in the airbag ECU 1 by the determined result is updated (Step 6).

Thereby, if the vehicle has a small variation, for example, as in the time of low speed turn, even if the load sensors 3a to 3d detect a small sum of variable amounts and it is determined that the vehicle is stable, it can be determined that the occupant is not changed because the total weight has a small variation. Hence, the occupant-sitting determination is not performed.

Therefore, the occupant-sitting determination is excessively not performed, and hence it is possible to prevent erroneous occupant-sitting determinations in an unstable state such as in a vehicle turn at a low speed or the like and accomplish improved reliability of occupant detection.

In this way, the occupant-detecting apparatus as mentioned in the first embodiment includes the plurality of load sensors 3a to 3d configured to detect a load imparted on the vehicle seat 4, and the occupant-sitting determination device 2 configured to determine whether or not an occupant is seated on the vehicle seat 4, based on the detected results of the load sensors 3a to 3d.

The load sensors 3a to 3d are configured to detect loads at different positions on the vehicle seat 4. The occupant-sitting determination device 2 is configured so that occupant-sitting determination is not performed if an absolute value ΔW of the variable amount in a sum of detected results of the load sensors 3a to 3d is less than a predetermined threshold value TH/L.

Thereby, because a total weight applied to the seat 4 has a small variation if the vehicle has a small variation, for example, such as low speed turn or the like, it can be determined that the occupant is not changed, and hence the occupant-sitting determination is not performed.

Second Embodiment

Next, an occupant-detecting apparatus according to a second embodiment of the present invention is described.

The occupant-detecting apparatus in the second embodiment has a similar structure to that in the aforementioned first embodiment.

Therefore, a description of the occupant-detecting apparatus in the second embodiment regarding the similar structure to the occupant-detecting apparatus in the first embodiment is omitted.

Figure 5:
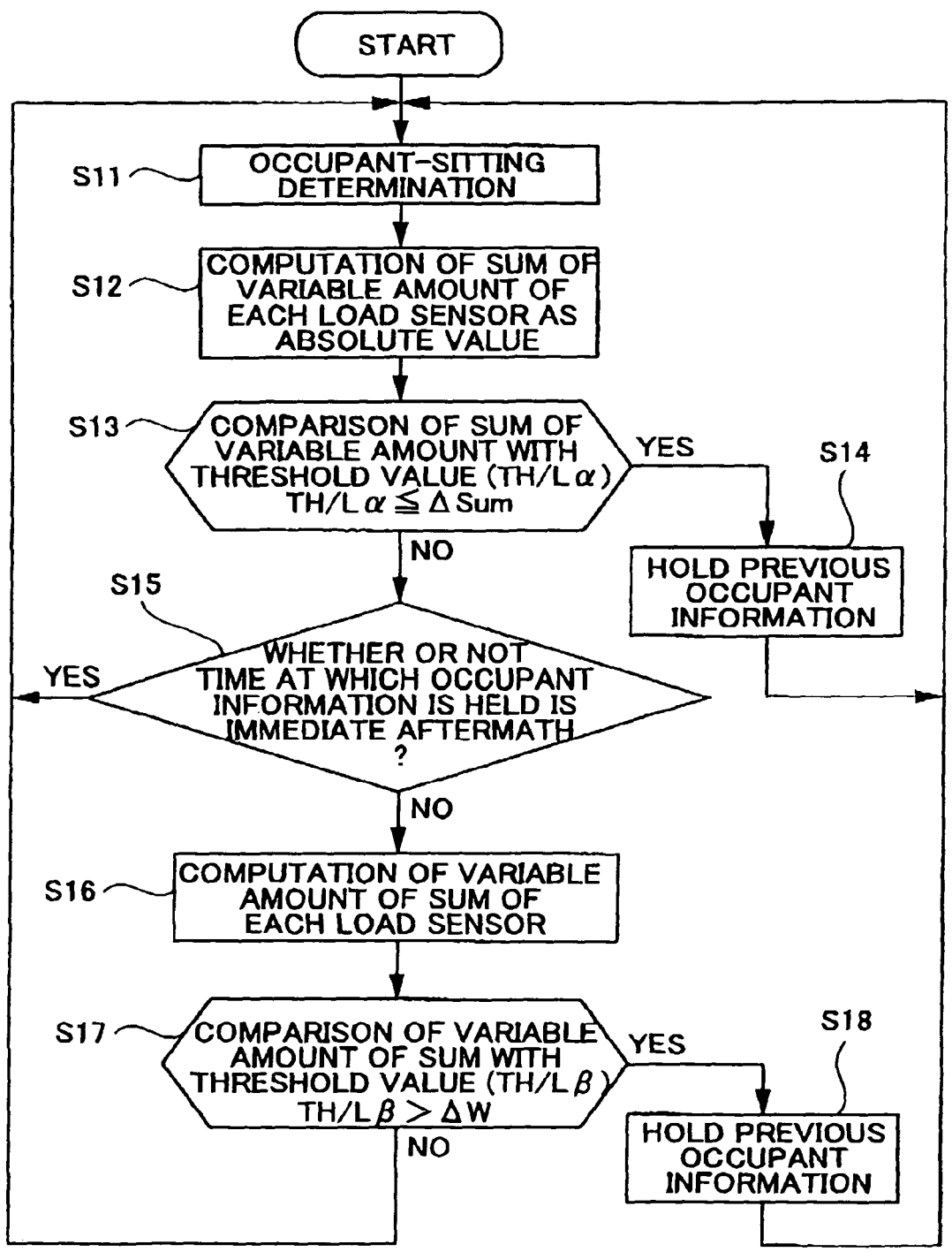
FIG. 5 is a flow chart showing a process for occupant-sitting determination in the occupant-detecting apparatus according to the second embodiment of the present invention.

A process for occupant-sitting determination of the occupant-detecting apparatus in the second embodiment is described below with reference to a flow chart shown in FIG. 5.

In the process of the occupant-sitting determination of the occupant-detecting apparatus in the second embodiment, a load imparted on the seat 4 is first detected by the four load sensors 3a to 3d to compute a weight W of an occupant, and occupant-sitting determination is performed based on the computed occupant's weight W (Step 11).

Next, a sum (ΔSum) is computed by adding all variable amounts, and a variable amount between a previous sampling value and a new sampling value of each of the load sensors 3a to 3d is set as an absolute value (Step 12).

The computed sum (ΔSum) is compared with a predetermined threshold value TH/L a (Step 13).

If the sum (ΔSum) is larger than the threshold value TH/Lα (TH/Lα≦ΔSum), in other words, if it is YES in the Step 12, it is determined that the vehicle is "during variation", the occupant-sitting determination is not performed to hold occupant's information (Step 14).

If the sum (ΔSum) is lesser than the threshold value TH/Lα (TH/Lα<ΔSum), in other words, if it is NO in the Step 12, because the sum (ΔSum) is already larger than the threshold value TH/L a, it is determined whether or not the time at which the occupant's information is held is the immediate aftermath (Step 15).

If the time at which the occupant's information is held is the immediate aftermath, in other words, if it is YES in the Step 15, the process returns to the Step 11 and the occupant-sitting determined is performed. The occupant's information is then updated based on the determined result.

More specifically, after the occupant information is held, the occupant-sitting determination is performed despite a magnitude of the variable amount ΔW of the sum of the loads detected by the load sensors 3a to 3d.

Consequently, even if erroneous determination is made in the Step 13, the occupant-sitting determination is newly achieved without considering the previous occupant information held based on the erroneous determination and the occupant information can be updated. Therefore, it is possible to further enhance reliability of the occupant detection.

Also, if the occupant information is not held, that is to say, it is NO in the Step 15, the variable amount ΔW of the sum of the loads detected by the load sensors 3a to 3d is computed (Step 16).

The variable amount ΔW of the sum is compared with a predetermined threshold value TH/Lβ (Step 17).

If the variable amount ΔW of the sum is less than the predetermined threshold value TH/Lβ (ΔW<TH/Lβ) that is to say, if it is YES in the Step 17, the occupant-sitting determination is not performed and the occupant information is held (Step 18), the variable amount ΔW of the sum is larger than the predetermined threshold value TH/Lβ (ΔW≧TH/Lβ), that is to say, if it is NO in the Step 17, the process returns to the Step 11, the occupant-sitting determination is performed and the occupant information is updated based on the determined result.

In this way, in the occupant-detecting apparatus according to the second embodiment, if the sum (ΔSum) of the absolute value of variable amounts of the detected result of the plurality of load sensors 3a to 3d is larger than the predetermined threshold value TH/L a, the occupant-sitting determination device 2 does not perform the occupant-sitting determination, but performs the occupant-sitting determination despite the magnitude of the absolute value ΔW of variable amounts of the sum of detected result of the plurality of load sensors 3a to 3d after the occupant-sitting determination is not performed as mentioned above.

Thereby, because the sum (ΔSum) of the absolute value of variable amounts of the detected result of the plurality of load sensors 3a to 3d is larger than the predetermined threshold value TH/L a, if the occupant-sitting determination is not performed, even if an erroneous determination is made, the erroneous determination is not considered.

Therefore, it is possible to update the occupant information by executing new occupant-sitting determination, enabling enhancing reliability of the occupant detection.

The occupant-detecting apparatus determines that the occupant is not changed in a case where the vehicle has a small variation such as in vehicle turn at a low speed or the like and does not perform the occupant-sitting determination. Therefore, it is possible to prevent excessive occupant-sitting determinations, erroneous determinations in an unstable state as in the time of vehicle turn at a low speed or the like, and enhance reliability of the occupant detection.

In addition, when the occupant-sitting determination is performed by detecting a vehicle state based on the sum of the absolute value of variable amounts of detected result of the plurality of load sensors 3a to 3d, even if an erroneous determination is made, the erroneous determination is not considered, thereby it is possible to further enhance reliability of the occupant detection.

Although the preferred embodiments of the present invention have been described, it should be noted that the present invention is not limited to these embodiments, various changes and modifications can be made to the embodiments.

What is claimed is:
1. An occupant-detecting apparatus, comprising:
 a plurality of load sensing devices each configured to detect a load imparted on a vehicle seat; and
 an occupant-sitting determination device configured to determine whether or not an occupant is seated on the vehicle seat based on detected loads of the load sensing devices, said load sensing devices being configured to detect loads at a plurality of different positions on the vehicle seat, and said occupant-sitting determination device being configured to determine whether to perform an occupant-sitting determination based on a comparison between a predetermined threshold value and an absolute value of a variable amount between a sum of previously-collected load sample values and a sum of presently-collected load sample values detected by the load sensing devices.

2. The occupant-detecting apparatus according to claim 1, wherein said occupant-sitting determination device is configured not to perform the occupant-sitting determination if the absolute value is less than the predetermined threshold value.

3. The occupant-detecting apparatus according to claim 1, wherein said occupant-sitting determination device is configured not to perform the occupant-sitting determination if the absolute value is larger than the predetermined threshold value, and to then perform the occupant-sitting determination despite a magnitude of the absolute value after the occupant-sitting determination is initially not performed.

4. The occupant-detecting apparatus according to claim 1, wherein each of said load sensing devices comprises a load sensor.

5. The occupant-detecting apparatus according to claim 4, wherein the load sensors are mounted on the vehicle seat and configured to detect the loads at the plurality of different positions on the vehicle seat.

6. The occupant-detecting apparatus according to claim 1, wherein the occupant-sitting determination device includes an occupant ECU to detect the presence of an occupant.

7. The occupant-detecting apparatus according to claim 1, wherein the occupant-sitting determination device is configured to process an output from the load sensing devices and is configured to determine whether or not an occupant is seated on the vehicle seat, and whether the occupant is an adult or child using a child seat.

* * * * *